(12) United States Patent
Su

(10) Patent No.: US 12,385,626 B2
(45) Date of Patent: Aug. 12, 2025

(54) BATTERY CASE FOR LIGHT-FIXTURE

(71) Applicant: Lin Su, Yiyang (CN)

(72) Inventor: Lin Su, Yiyang (CN)

( * ) Notice: Subject to any disclaimer, the term of this patent is extended or adjusted under 35 U.S.C. 154(b) by 0 days.

(21) Appl. No.: 19/016,405

(22) Filed: Jan. 10, 2025

(65) Prior Publication Data

US 2025/0146650 A1 May 8, 2025

(30) Foreign Application Priority Data

Dec. 27, 2024 (CN) ......................... 202423262622.X

(51) Int. Cl.
*F21V 15/01* (2006.01)
*F21S 9/02* (2006.01)

(52) U.S. Cl.
CPC ................. *F21V 15/01* (2013.01); *F21S 9/02* (2013.01)

(58) Field of Classification Search
CPC ............. F21V 15/01; F21V 23/04; F21S 9/02
See application file for complete search history.

(56) References Cited

U.S. PATENT DOCUMENTS

| | | | | |
|---|---|---|---|---|
| 2,892,537 A * | 6/1959 | Schwartz | ............... | G07D 9/002 206/0.81 |
| 3,341,701 A * | 9/1967 | Moore | ............... | F21L 2/00 362/196 |
| 5,263,577 A * | 11/1993 | Paratte | ............... | G04C 10/00 206/38.1 |
| 5,475,368 A * | 12/1995 | Collins | ............... | G08B 15/004 362/116 |
| 6,119,864 A * | 9/2000 | Kessler | ............... | B65D 83/04 206/703 |
| 6,840,650 B2 * | 1/2005 | Parsons | ............... | F21V 23/0414 362/205 |
| 6,848,577 B2 * | 2/2005 | Kawamura | ............... | A45C 11/182 206/37 |
| 7,798,415 B1 * | 9/2010 | Bates | ............... | A44B 15/005 206/37 |
| 11,021,293 B2 * | 6/2021 | Bailey | ............... | B65D 83/0409 |
| 2002/0056652 A1 * | 5/2002 | Kawamura | ............... | A45C 11/182 206/37 |
| 2007/0045150 A1 * | 3/2007 | Huffer | ............... | B65D 83/0463 206/538 |

* cited by examiner

*Primary Examiner* — Tsion Tumebo
(74) *Attorney, Agent, or Firm* — Westbridge IP LLC

(57) ABSTRACT

A battery case for a light-fixture includes a case body and a holder. The case body is provided with a sliding slot and a locking slot, the sliding slot communicates with an outer side of the case body, the holder includes a body portion, a locking portion and a drawer, the locking portion and the drawer are respectively connected to the body portion, and the body portion is slidably mounted on the sliding slot and is used for mounting a battery; when the body portion is completely slid into the sliding slot, the locking portion is snapped into the locking slot; the locking portion is flipped to be disengaged from the locking slot and operate the drawer, so that the body portion is slid out of the sliding slot; the design of flipping the locking portion provides an intuitive operation mode for a user.

9 Claims, 2 Drawing Sheets

BATTERY CASE FOR LIGHT-FIXTURE

CROSS-REFERENCE TO RELATED APPLICATIONS

This application claims priority to Chinese Patent Application No. 202423262622.X, filed on Dec. 27, 2024, the content of which is incorporated herein by reference in its entirety.

TECHNICAL FIELD

The present application relates to the technical field of light-fixture devices, and more particularly to a battery case for a light-fixture.

BACKGROUND

Light-fixtures are luminaires often used by people during holidays nowadays. People design these luminaires from their respective creatives in a shape or appearance very similar to that of a physical object with holiday characteristics, elements, etc. so as to better dry the festival atmosphere, and due to different use requirements, such as use safety and outdoor use, such light-fixture often needs to be DC-driven with batteries.

However, many designs for battery case for a light-fixture do not facilitate battery replacement. Users often need to disassemble multiple components when changing batteries, which is both time consuming and prone to damage the battery case.

SUMMARY

The technical problem to be solved by the present application is to provide a battery case for a light-fixture that facilitates removal of the battery.

In order to solve the above-mentioned technical problem, the technical solution adopted by the present application is a battery case for a light-fixture, which includes a case body and a holder, where the case body is provided with a sliding slot and a locking slot, the sliding slot communicates with an outer side of the case body, the holder includes a body portion, a locking portion and a drawer, the locking portion and the drawer are respectively connected to the body portion, and the body portion is slidably mounted on the sliding slot and is used for mounting a battery; when the body portion is completely slid into the sliding slot, the locking portion is snapped into the locking slot; the locking portion is flipped to be disengaged from the locking slot and operate the drawer, so that the body portion is slid out of the sliding slot.

Further, the body portion is provided with a clamping slot, and the battery is mounted in the clamping slot.

Further, the body portion is provided with two elastic clamping arms, and the two elastic clamping arms enclose to form the clamping slot.

Further, the holder is of an integrated unitary structure.

Further, the drawer is provided with a drawing slot, and the drawing slot is exposed to the case body.

Further, a side of the case body facing away from the sliding slot opening is provided with a handle.

Further, the case body includes a base and a cover plate connected to the base, and the sliding slot is provided in the base and communicates with an outer side wall of the base.

Further, the cover plate is detachably connected with the base.

Further, the body portion is further provided with an identification portion, an outer surface of the case body is provided with a window communicating with the sliding slot, and the identification portion is exposed to the window when the body portion is completely slid into the sliding slot.

Further, the identification portion is provided with a reflective coating.

The beneficial effects of the present application are as follows: for the battery case for a light-fixture provided by the present application, by means of designs for the innovative sliding slot and locking slot, fast assembly and unassembly and stable fixation of the battery case is achieved. This design not only simplifies the battery replacement process, reduces the complexity of the user's operation, but also improves the service life and reliability of the battery case. The sliding slot is designed to allow the body portion to slide freely in the case body, while the locking slot ensures that the battery case can be securely locked after the body portion is completely slid in, so as to prevent the battery from falling off due to vibration or accidental collision, thereby enhancing the safety of using the battery; the design of flipping the locking portion provides an intuitive operation mode for a user, so that unlocking and replacing the battery become faster and more convenient, and the replacement of the battery can be easily accomplished without additional tools; the provision of the drawer further optimizes the user experience by allowing the user to easily withdraw the body portion from the sliding slot by means of the drawer without requiring complicated operations, making battery replacement more efficient.

DETAILED DESCRIPTION OF THE EMBODIMENTS

In order to explain the technical contents, the objects, and the effects of the present application in detail, the embodiments will be described below referring to the accompanying drawings.

Figure 1:
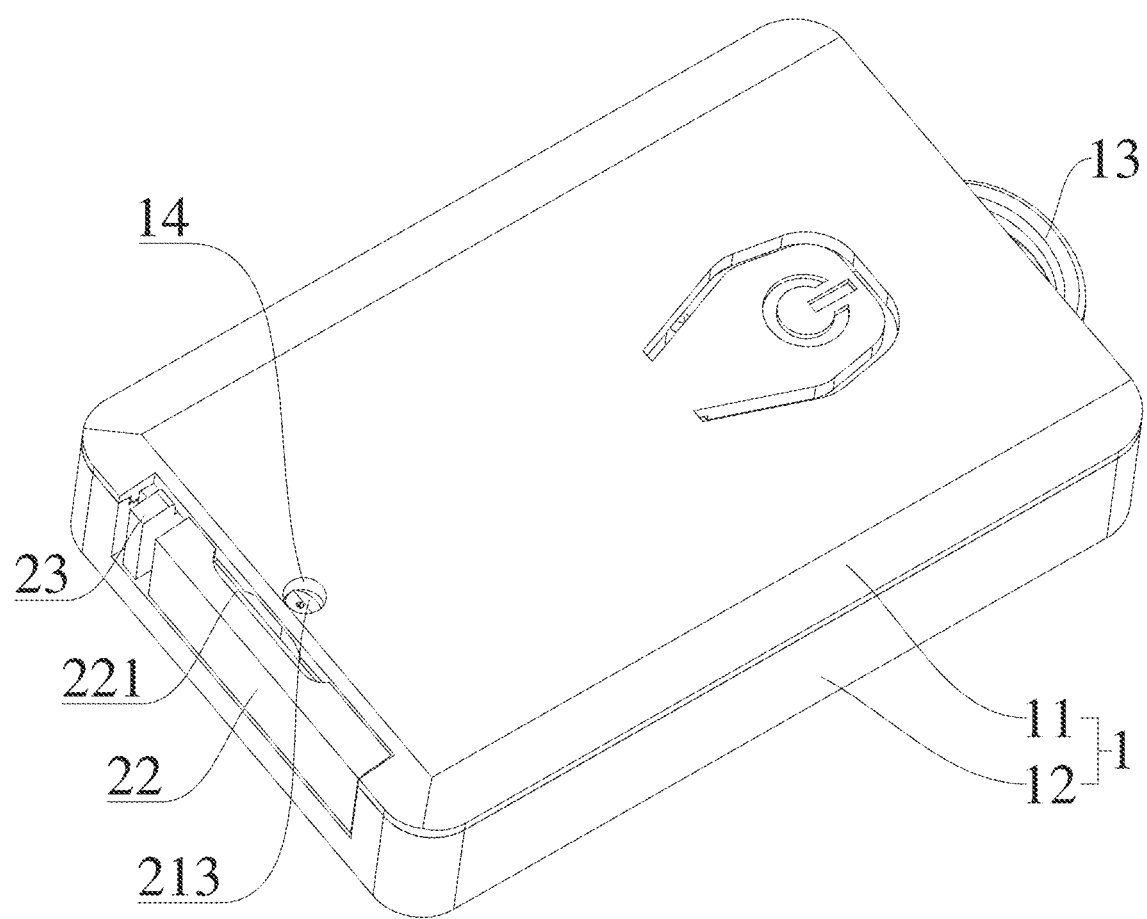
FIG. 1 is an assembly view of a battery case for a light-fixture according to a first embodiment of the present application.
Figure 2:
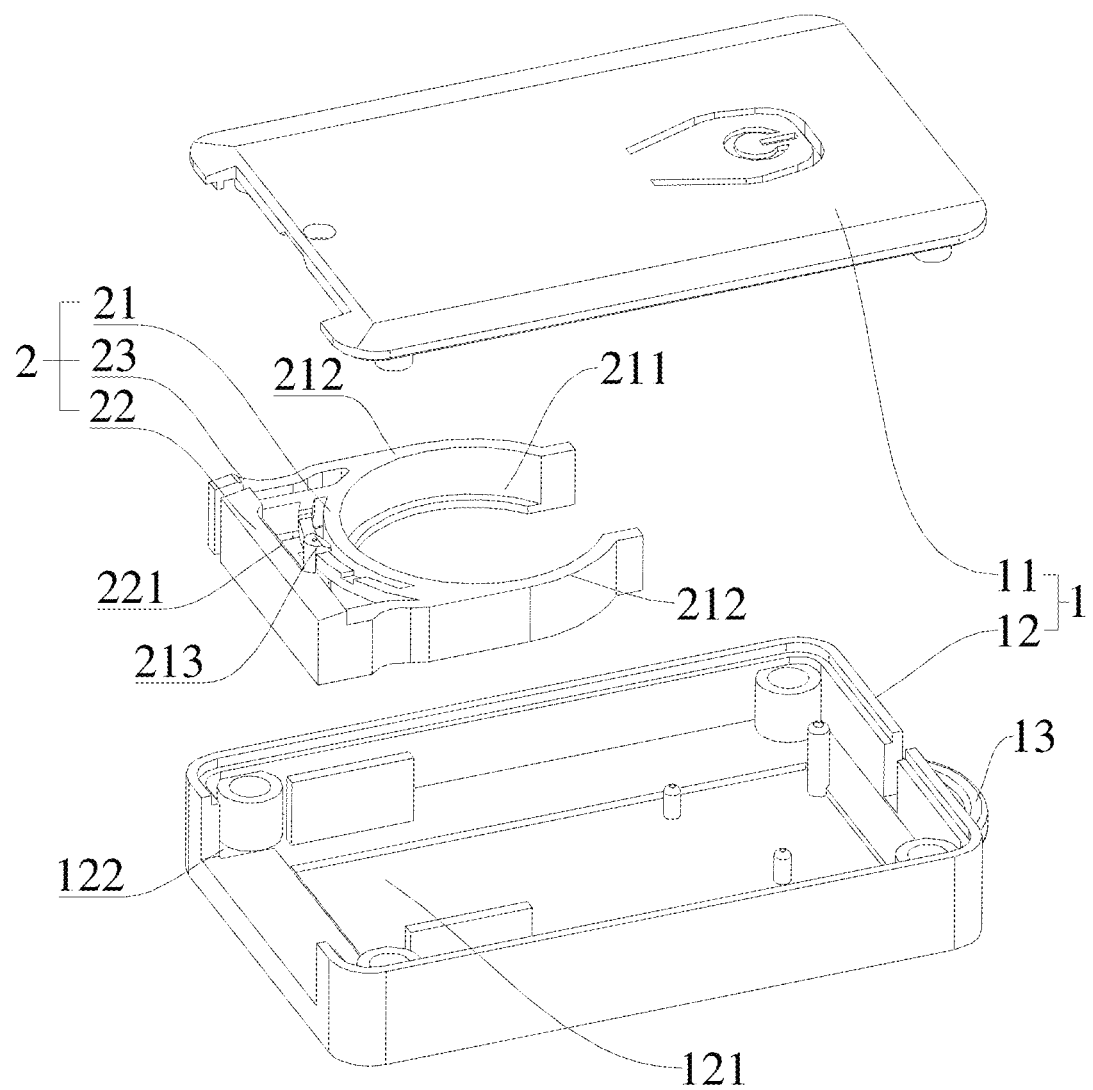
FIG. 2 is an exploded view of a battery case for a light-fixture according to a first embodiment of the present application.

Referring to FIGS. 1 and 2, a battery case for a light-fixture includes a case body 1 and a holder 2, where the case body 1 is provided with a sliding slot 121 and a locking slot 122, the sliding slot 121 communicates with an outer side of the case body 1, the holder 2 includes a body portion 21, a locking portion 23 and a drawer 22, the locking portion 23 and the drawer 22 are respectively connected to the body portion 21, and the body portion 21 is slidably mounted on the sliding slot 121 and is used for mounting a battery; when the body portion 21 is completely slid into the sliding slot 121, the locking portion 23 is snapped into the locking slot 122; the locking portion 23 is flipped to be disengaged from the locking slot 122 and operate the drawer 22, so that the body portion 21 is slid out of the sliding slot 121.

It can be seen from the above-mentioned description that the beneficial effects of the present application are as follows: by means of designs for the innovative sliding slot 121 and locking slot 122, fast assembly and unassembly and stable fixation of the battery case is achieved. This design not only simplifies the battery replacement process, reduces the complexity of the user's operation, but also improves the service life and reliability of the battery case. The sliding slot 121 is designed to allow the body portion 21 to slide freely in the case body 1, while the locking slot 122 ensures that the battery case can be securely locked after the body portion 21 is completely slid in, so as to prevent the battery from falling off due to vibration or accidental collision, thereby enhancing the safety of using the battery; the design of flipping the locking portion 23 provides an intuitive operation mode for a user, so that unlocking and replacing the battery become faster and more convenient, and the replacement of the battery can be easily accomplished without additional tools; the provision of the drawer 22 further optimizes the user experience by allowing the user to easily withdraw the body portion 21 from the sliding slot 121 by means of the drawer 22 without requiring complicated operations, making battery replacement more efficient.

Further, the body portion 21 is provided with a clamping slot 211, and the battery is mounted in the clamping slot 211.

It can be seen from the above-mentioned description that by providing the body portion 21 with the clamping slots 211, the battery can be more stably fixed, sloshing of the battery in the battery case can be reduced, and the safety and reliability of the battery can be improved.

Further, the body portion 21 is provided with two elastic clamping arms 212, and the two elastic clamping arms 212 enclose to form the clamping slot 211.

It can be seen from the above-mentioned description that two elastic clamping arms 212 are designed to be enclosed to form a clamping slot 211, and by using the elastic properties of the elastic clamping arms 212, the battery can be easily clamped and released while ensuring the stability of the battery in the battery case.

Further, the holder 2 is an integrated unitary structure.

It can be seen from the above-mentioned description that the holder 2 may be of a unitary structure, which enhances the overall stability and durability, reduces the complexity in the assembly process and reduces the production cost.

Further, the drawer 22 is provided with a drawing slot 221, and the drawing slot 221 is exposed to the case body 1.

It can be seen from the above-mentioned description that the drawer 22 is provided with a drawing slot 221 which is exposed to the case body 1, providing a structure convenient for a user to operate, so that the drawing operation of the battery case is more convenient and labor-saving.

Further, the side of the case body 1 facing away from the opening of the sliding slot 121 is provided with a handle 13.

It can be seen from the above-mentioned description that a handle 13 is provided on the side of the case body 1 facing away from the opening of the sliding slot 121, so as to provide an additional holding point, so as to facilitate the user in stabilizing the battery case when replacing the battery and preventing the battery case from sliding off.

Further, the case body 1 includes a base 12 and a cover plate 11 connected to the base 12, and the sliding slot 121 is provided on the base 12 and communicates with an outer side wall of the base 12.

It can be seen from the above-mentioned description that the case body 1 is composed of a base 12 and a cover plate 11, and a sliding slot 121 is provided on the base 12 and communicates with a side wall, and such design makes the structure of the battery case more compact, and at the same time facilitates the mounting and replacement of the battery.

Further, the cover plate 11 is detachably connected with the base 12.

It can be seen from the above-mentioned description that the design of the detachable connection between the cover plate 11 and the base plate 12 makes maintenance and repair of the battery case more convenient, and a user can easily open the battery case for battery replacement or repair according to needs.

Further, the body portion 21 is further provided with an identification portion 213, an outer surface of the case body 1 is provided with a window 14 communicating with the sliding slot 121, and the identification portion 213 is exposed to the window 14 when the body portion 21 is completely slid into the sliding slot 121.

It can be seen from the above-mentioned description that the body portion 21 is provided with an identification portion 213, the outer surface of the case body 1 is provided with a window 14, and the identification portion 213 is exposed to the window 14 when the body portion 21 is completely slid into the sliding slot 121, providing a visual indication to help a user confirm whether the battery has been mounted correctly.

Further, the identification portion 213 is provided with a reflective coating.

It can be seen from the above-mentioned description that the identification portion 213 is provided with a reflective coating, which improves the visibility of the identification portion 213, and especially in a dark environment, the reflective coating can reflect light, so that the identification portion 213 can be more easily identified, and the convenience and safety of use are increased.

Referring to FIGS. 1 and 2, the first embodiment of the present application is: a battery case for a light-fixture includes a case body 1 and a holder 2, where the case body 1 is provided with a sliding slot 121 and a locking slot 122, the sliding slot 121 communicates with an outer side of the case body 1, the holder 2 includes a body portion 21, a locking portion 23 and a drawer 22, the locking portion 23 and the drawer 22 are respectively connected to the body portion 21, and the body portion 21 is slidably mounted on the sliding slot 121 and is used for mounting a battery; when the body portion 21 is completely slid into the sliding slot 121, the locking portion 23 is snapped into the locking slot 122; the locking portion 23 is flipped to be disengaged from the locking slot 122 and operate the drawer 22, so that the body portion 21 is slid out of the sliding slot 121; specifically, the battery is a button battery, the body portion 21 is provided with a clamping slot 211, the battery is mounted in the clamping slot 211, and by providing the body portion 21 with the clamping slot 211, the battery can be more stably fixed, sloshing of the battery in the battery case can be reduced, and the safety and reliability of the battery can be improved; more specifically, the body portion 21 is provided with two elastic clamping arms 212, and the two elastic clamping arms 212 close to form the clamping slot 211; and by using the elastic property of the elastic clamping arms 212, the battery can be easily clamped and released while ensuring the stability of the battery in the battery case.

Preferably, the holder 2 is of an integrated unitary structure, and the holder 2 may be of a unitary structure, which enhances the overall stability and durability, reduces the complexity in the assembly process and reduces the production cost; the holder 2 is made of a plastic material.

In the present embodiment, the drawer 22 is provided with a drawing slot 221 exposed to the case body 1, and the drawing slot 221 provides a structure convenient for a user to operate, so that the pulling operation of the battery case is more convenient and labor-saving; specifically, a handle 13 is provided on the side of the case body 1 facing away from the opening of the sliding slot 121, so as to provide an additional holding point, so as to facilitate the user in stabilizing the battery case when replacing the battery and preventing the battery case from sliding off.

Preferably, the case body 1 includes a base 12 and a cover plate 11 connected to the base 12, and the sliding slot 121 is provided on the base 12 and communicates with an outer side wall of the base 12, and such design makes the structure of the battery case more compact, and at the same time facilitates the mounting and replacement of the battery; specifically, the cover plate 11 is detachably connected to the base 12, thus making the maintenance and repair of the battery case more convenient, and a user can easily open the battery case for battery replacement or maintenance according to needs; the detachable connections include, but are not limited to, screw connections, bolt connections, snap connections, magnetic suction connections, or adhesive connections.

In the present embodiment, the body portion 21 is further provided with an identification portion 213, the outer surface of the case body 1 is provided with a window 14 communicating with the sliding slot 121, the identification portion 213 is exposed to the window 14 when the body portion 21 is completely slid into the sliding slot 121, the body portion 21 is provided with an identification portion 213, the outer surface of the case body 1 is provided with a window 14, the identification portion 213 is exposed to the window 14 when the body portion 21 is completely slid into the sliding slot 121, providing a visual indication to help a user to confirm whether the battery has been mounted correctly; alternatively, the identification portion 213 may be provided with a reflective coating (not shown) to improve the visibility of the identification portion 213, especially in darker light environments where the reflective coating reflects light, making the identification portion 213 easier to identify, increasing ease of use and security.

In summary, for the battery case for a light-fixture provided by the present application, by means of designs for the innovative sliding slot and locking slot, fast assembly and unassembly and stable fixation of the battery case is achieved. This design not only simplifies the battery replacement process, reduces the complexity of the user's operation, but also improves the service life and reliability of the battery case. The sliding slot is designed to allow the body portion to slide freely in the case body, while the locking slot ensures that the battery case can be securely locked after the body portion is completely slid in, so as to prevent the battery from falling off due to vibration or accidental collision, thereby enhancing the safety of using the battery; the design of flipping the locking portion provides an intuitive operation mode for a user, so that unlocking and replacing the battery become faster and more convenient, and the replacement of the battery can be easily accomplished without additional tools; the provision of the drawer further optimizes the user experience by allowing the user to easily withdraw the body portion from the sliding slot by means of the drawer without requiring complicated operations, making battery replacement more efficient.

The above-mentioned embodiments are merely examples of the present application and are not intended to limit the scope of the present application, and all changes which come within the meaning and range of equivalence of the present application and the appended claims are to be embraced within their scope.

What is claimed is:

1. A battery case for a light-fixture, comprising a case body and a holder, wherein
   the case body is provided with a sliding slot and a locking slot, the sliding slot communicates with an outer side of the case body, the holder comprises a body portion, a locking portion and a drawer, the locking portion and the drawer are respectively connected to the body portion, and the body portion is slidably mounted on the sliding slot and is used for mounting a battery;
   when the body portion is completely slid into the sliding slot, the locking portion is snapped into the locking slot;
   the locking portion is flipped to be disengaged from the locking slot and operate the drawer, so that the body portion is slid out of the sliding slot; and
   the body portion is provided with an identification portion, an outer surface of the case body is provided with a window communicating with the sliding slot, and the identification portion is exposed to the window when the body portion is completely slid into the sliding slot.

2. The battery case for the light-fixture according to claim 1, wherein the body portion is provided with a clamping slot, and the battery is mounted in the clamping slot.

3. The battery case for the light-fixture according to claim 2, wherein the body portion is provided with two elastic clamping arms, and the two elastic clamping arms enclose to form the clamping slot.

4. The battery case for the light-fixture according to claim 1, wherein the holder is of an integrated unitary structure.

5. The battery case for the light-fixture according to claim 1, wherein the drawer is provided with a drawing slot, and the drawing slot is exposed to the case body.

6. The battery case for the light-fixture according to claim 1, wherein a side of the case body facing away from the sliding slot opening is provided with a handle.

7. The battery case for the light-fixture according to claim 1, wherein the case body comprises a base and a cover plate connected to the base, and the sliding slot is provided in the base and communicates with an outer side wall of the base.

8. The battery case for the light-fixture according to claim 7, wherein the cover plate is removably connected to the base.

9. The battery case for the light-fixture according to claim 1, wherein the identification portion is provided with a reflective coating.

* * * * *